(12) United States Patent
Ozu

(10) Patent No.: US 6,185,234 B1
(45) Date of Patent: Feb. 6, 2001

(54) LASER OSCILLATION DEVICE

(75) Inventor: Akira Ozu, Ibaraki (JP)

(73) Assignee: Japan Atomic Energy Research Institute, Tokyo (JP)

( * ) Notice: Under 35 U.S.C. 154(b), the term of this patent shall be extended for 0 days.

(21) Appl. No.: 09/200,865

(22) Filed: Nov. 27, 1998

(30) Foreign Application Priority Data

Nov. 28, 1997 (JP) .................................................. 9-329039
Nov. 9, 1998 (JP) .................................................. 10-318177

(51) Int. Cl.⁷ .............................. H01S 3/04; H01S 3/091; H01S 3/00
(52) U.S. Cl. ................................. 372/34; 372/76; 372/109
(58) Field of Search ................................ 372/34, 109, 76

(56) References Cited

U.S. PATENT DOCUMENTS 5,335,238 * 8/1994 Bahns ...................................... 372/37
5,353,293 * 10/1994 Shull ...................................... 372/34

* cited by examiner

Primary Examiner—Frank G. Font
Assistant Examiner—Armando Rodriguez
(74) Attorney, Agent, or Firm—Wenderoth, Lind & Ponack, L.L.P.

(57) ABSTRACT

A new laser oscillation device is provided which is capable of readily cooling down a laser medium without employing any large-size complicated separate or discrete devices such as fan blowers while at the same time improving the laser oscillation efficiency to thereby easily generate high-output laser light. To this end, a Lorentz force drive electromagnetic pump and a cooling device are provided in a way such that the Lorentz force drive electromagnetic pump is operable to drive the laser medium while allowing the cooling device to cool down the laser medium being driven.

8 Claims, 4 Drawing Sheets

LASER OSCILLATION DEVICE

BACKGROUND OF THE INVENTION

1. Field of the Invention

The present invention relates to laser oscillation apparatus. More particularly, this invention relates to new laser oscillator devices adaptable for use as laser-machining discharge excitation type laser oscillators which require large-output and high-efficiency laser light.

2. Description of the Related Art

Typically, in a discharge laser oscillation apparatus, the discharge is performed with respect to a laser medium in order to attain laser oscillation. When this is done, the laser medium increases in temperature. The higher the medium temperature, the less the efficiency of such laser oscillation. This phenomenon will become more severe especially in pulse laser oscillation devices.

Conventionally, in order to avoid such reduction of laser oscillation efficiency due to temperature increase of the laser medium thereby obtaining efficiency-enhanced laser oscillation, one approach is to wait for the laser medium to have lowered its temperature down to an acceptable level; another approach is to replace and cool the laser medium per se.

Additionally, in large-output lasers such as an excimer laser or carbon dioxide gas laser or the like, a convection device such as a fan blower or the like as well as a thermal exchanging machine are provided inside of a laser tube for forcibly causing a laser medium gas to exhibit convection to thereby achieve cooling by substitution and circulation from a laser cavity or between electrodes, which in turn lets the resulting laser output power stay higher.

However, in the prior art, large-output fan blower devices have been required in order to attain the circulation or percolation of the laser medium such as a gas or the like within laser devices or laser tubes, which fan blowers might be configured from large-scale complicated electrical equipment including a motor, fan, vacuum shaft coupler and others, resulting in an increase in the size and production cost of the laser devices and laser tubes concerned. Another problem faced in the prior art is that resultant power dissipation can significantly increase undesirably.

SUMMARY OF THE INVENTION

The present invention was developed in view of the foregoing technical background, and its primary object is to provide a laser oscillation device capable of readily cooling down laser media without having to employ any large-scale complicated separate apparatus or equipment such as fan blowers thereby improving the laser oscillation efficiency thus enabling generation of high-output laser light while reducing complexity.

BRIEF DESCRIPTION OF THE DRAWING

The forgoing and other objects, features and advantages of the present invention will be apparent from the following more particular description of preferred embodiments of the invention, taken in conjunction with the accompanying drawings, in which.

DETAILED DESCRIPTION OF THE INVENTION (First Embodiment)

Figure 1:
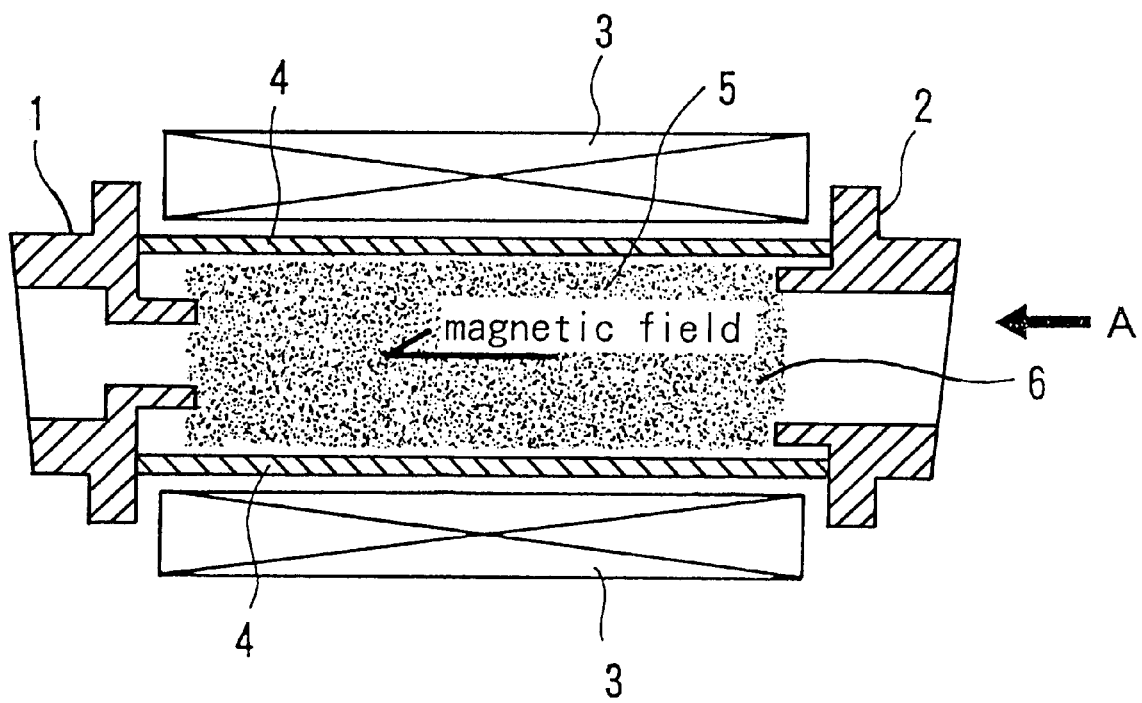
FIG. 1 in a diagram showing, in longitudinal cross section, a laser oscillation device of the longitudinal discharge type in accordance with. one preferred embodiment of this invention, which includes a laser tube and employs a coaxial cylindrical electrode structure.
Figure 2:
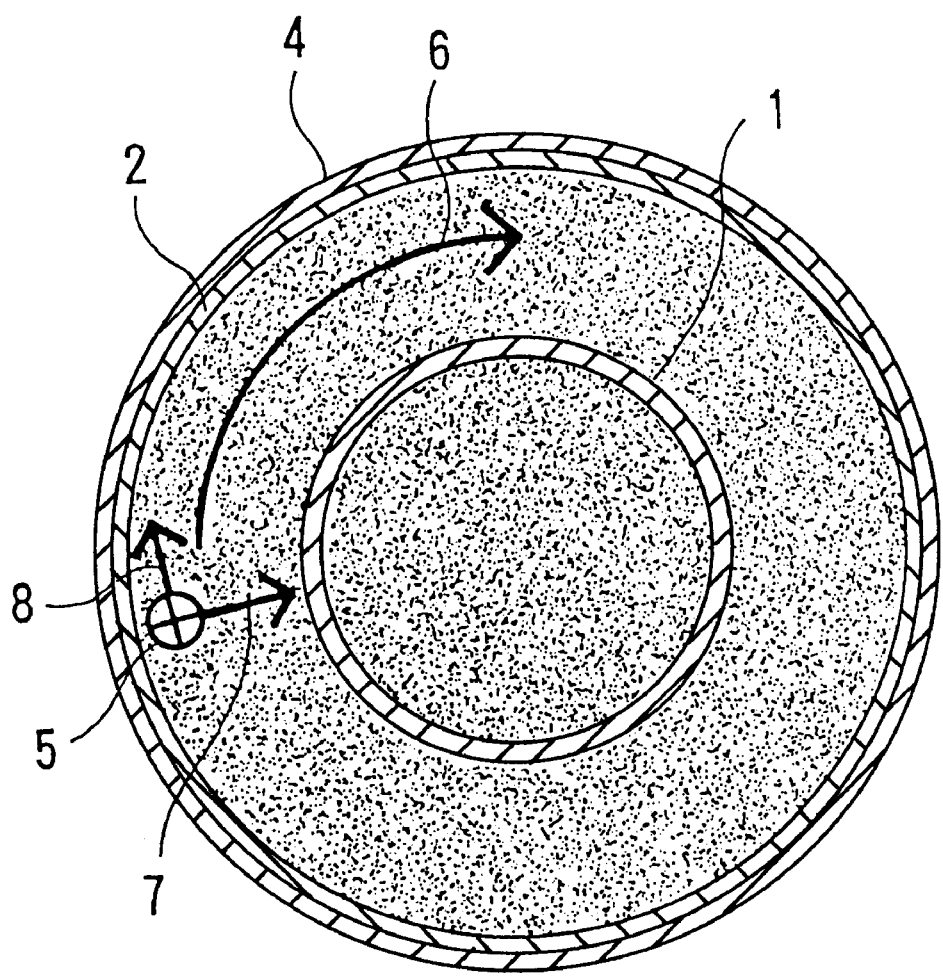
FIG. 2 is a diagram showing a cross-sectional view of the laser tube of the laser oscillator device as viewed from the direction of arrow "A" in FIG. 1.

Referring now to FIG. 1, there is illustrated in longitudinal cross section a laser oscillation device of the longitudinal discharge type including its laser tube employing a coaxial cylindrical electrode in accordance with one preferred embodiment of the present invention. see also FIG. 2, which is a cross-sectional view of the laser tube as viewed from the direction "A" of FIG. 1.

In the laser oscillator device shown as one example in FIG. 1, this device is configured to include a negative electrode or "cathode" 1 and positive electrode or "anode" 2 with a laser tube 4 being mounted therebetween. The cathode 1 and anode 2 are different in diameter dimension from each other. The laser tube 4 is surrounded with a solenoid coil 3, as a magnetic field generation means, which applies a magnetic field 5 axially between inter-electrodes of the laser tube 4. While the magnetic field 5 is being applied, when the discharge is performed between the cathode 1 and the anode 2, a discharge current 7 rushes to flow between the cathode 1 and anode 2 in the direction at right angles to the magnetic field 5 as conceptually shown in FIG. 2, which in turn causes effectuation of laser oscillation. When this is done, the Lorentz force 8 takes place due to such perpendicular discharging between the discharge current 7 and magnetic field 5 simultaneously when laser oscillation is effected, thereby allowing the resultant discharge plasma 6 to behave so as to convect within the laser tube 4 as exemplarily shown in FIG. 2 so that a laser medium in the laser oscillation region inside the cathode 1 is subject to replacement or substitution due to such convection. The laser medium thus substituted is moved from the laser cavity or between the electrodes and then effectively cooled down by the inner wall of the laser tube 4. The wall of laser tube 4 is being air-cooled.

In this laser oscillator device embodying the invention, it will also be permissible that a means is provided such as a device for forcing the convection of discharge plasma 6 within the laser tube 4 to flow into the center part of the laser tube 4 between the cathode 1 and anode 2; with this means, it becomes possible to further improve the substitution rate of the laser medium toward the inside of cathode 1.

Here, experimentation was carried out to measure a laser output actually obtainable from the laser oscillator device incorporating the principles of the invention shown in FIG. 1, which the laser output is relative to the magnetic field 5 in the axis direction. One typical measurement result is demonstrated in FIG. 3, which shows a relation of the measured laser output power (W) versus intensity (Gauss) of the axial magnetic field 5.

It should be noted that in the laser oscillator device used during the characteristic measurement, its laser medium was made of an HBr gas while employing a low-temperature copper-vapor laser having the aperture diameter of 40 mmφ as the laser tube 4. The storage capacitor charging voltage Vc was set at 20 kV. A Ne gas used was at a pressure of 22 Torr. HBr concentration was 5%, whereas the laser pulse repetition frequency was 15 kHz.

Figure 3:
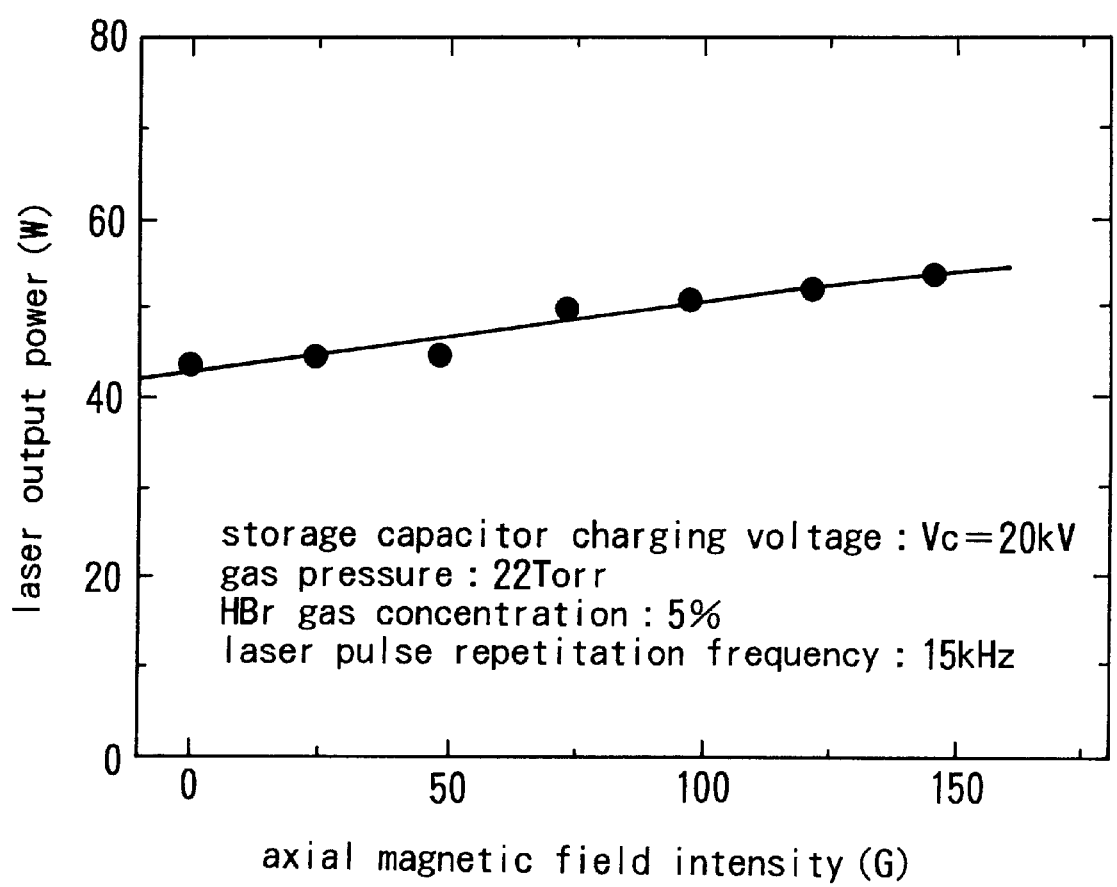
FIG. 3 is a graph exemplarily showing a relation of laser output obtainable from the laser oscillator shown in FIG. 1 versus an associated magnetic field in the coaxial direction thereof.

It is apparent by viewing the graph of FIG. 3 that as the axial magnetic field 5 applied by the solenoid coil 3 increases in magnitude, the resultant laser output likewise increases by several tens of percent (%) in intensity. It may be considered that the obtainability of such high laser output is originated from the fact that successful cooling was achieved in the discharge region by circulation of the laser medium inside the laser tub 4 due to presence of the Lorentz force. It may also be considered that an increase in laser output relative to such increase in magnetic field is due to the fact that the laser mediums circulation and cool-down speed depend upon the Lorentz force. Hence, it is possible by further increasing the magnetic field intensity to achieve further improvements of the laser output.

(Second Embodiment)

Figure 4:
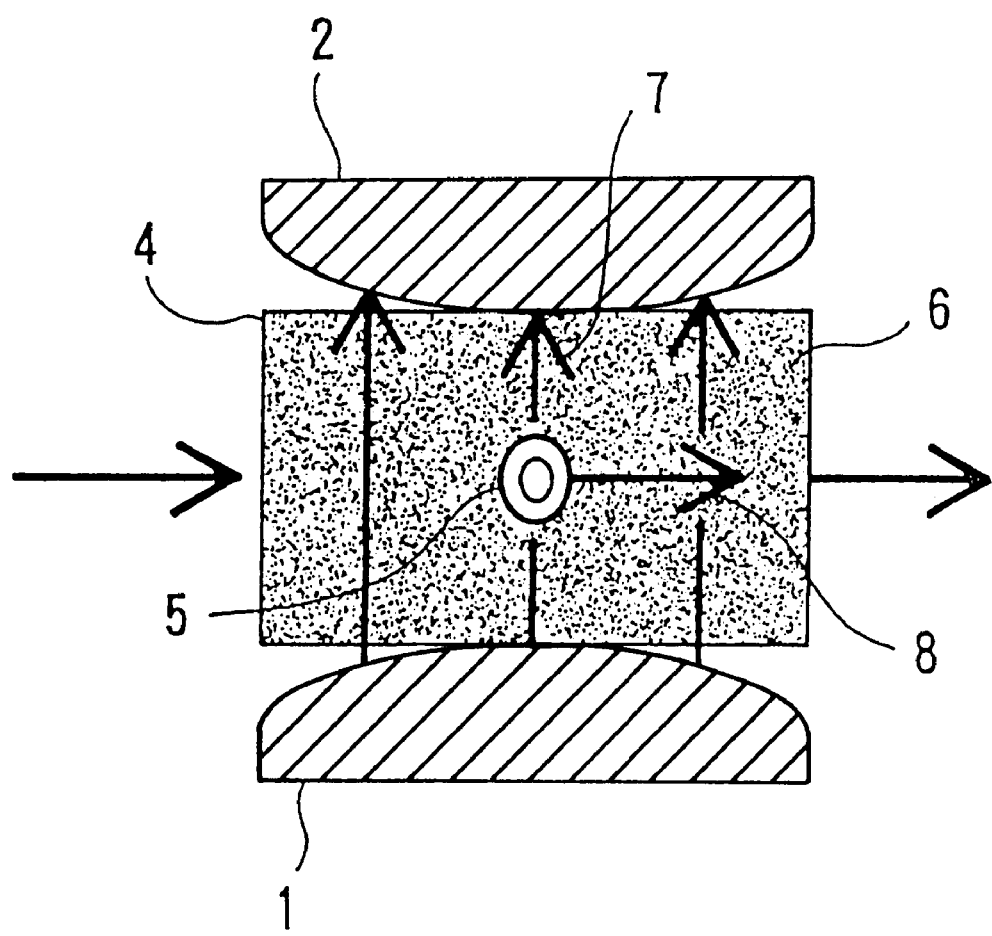
FIG. 4 depicts an interelectrode cross-sectional view of a laser medium drive mechanism used in. a laser oscillator device of the transverse discharge type employing an elongate electrode in accordance with another embodiment of this invention.

Turning now to FIG. 4, there is depicted in cross-section a laser medium drive mechanism of a laser oscillator device of the transverse discharge type which makes use of elongate electrodes in accordance with another embodiment of the invention.

The laser oscillator shown in FIG. 4 is arranged in such a way that its cathode 1 and anode 2 are externally applied a magnetic field 5 in a specified direction lying parallel to the longitudinal direction of the electrodes, by use of a magnetic field generation means (not shown) including but not limited to a variety of types of coil members (solenoid coils, Helmholtz coils, yoke coils, or the like) or magnets, or any equivalents thereto. When the discharge is effected between the. cathode 1 and anode 2 with the magnetic field 5 being applied thereto, a discharge current 7 attempts to flow in a direction perpendicular to the magnetic field 5, resulting in oscillation of laser. Upon occurrence of this laser oscillation, the Lorentz force 8 takes place simultaneously with respect to a discharge plasma 6 in the direction at right angles to both the discharge current 7 and the magnetic field 5. This Lorentz force 8 lets the discharge plasma 6 be pushed out of the space between the cathode 1 and anode 2, resulting in substitution i.e. circulation of the laser medium within the laser tube 4. This medium substitution in turn permits movement from the laser cavity or between the electrodes thus providing effective cooling activities.

As has been described above, the laser oscillator device embodying the invention has the Lorentz force drive electromagnetic pump mechanism for use in creating the Lorentz force due to the presence of a magnetic field as applied by the magnetic field generation means including but not limited to coils or magnets. This Lorentz force drive electromagnetic pump mechanism functions to allow the laser medium's plasma is driven in a prespecified direction at right angles to both the current and the magnetic field, thereby enabling achievement of sufficient cooling. It is thus possible to more readily accomplish, with no difficulties, the intended cooling and substitution of the laser medium being kept at high temperatures due to discharging, while avoiding a need for employment of any "special" laser medium set at low temperatures unlike the prior art.

Also note that laser oscillation is performed simultaneously when driving the laser medium due to interelectrode discharging. In this case the applied magnetic field lets electrons exhibit spiral motion, increasing the efficiency of impact or collision with associative atoms and molecules, which may in turn increase the laser efficiency.

Another advantage of the laser oscillator is that it becomes possible by the magnetic field as applied by the magnetic field generation means to achieve the required discharging with enhanced special uniformity inside the laser medium used.

It is noted here that while in the aforementioned embodiments the magnetic field generation means is arranged to be mounted outside the laser tube, this magnetic field generation means may alternatively be disposed inside the laser tube in such case also, the intended effects and advantages are obtainable which are similar to those in the case in which the generator is provided externally.

Also note that the cooler means for cooling the laser medium being presently driven should not exclusively be limited to the illustrative laser vacuum vessel's wall as set in the cooling condition such as air-cooling, and may also be designed employing a separate cooler machine where appropriate.

This invention should not be limited only to the aforementioned embodiments, and it will be understood by those skilled in the art that other changes in form and details may be made therein without departing from the spirit and scope of the invention.

As has been described in detail above, in accordance with this invention, there is provided a new and improved laser oscillator device capable of avoiding the necessity of using large-size complicated separate devices such as fan blowers unlike the prior art, and capable of facilitating cooling replacement/substitution of a laser medium by letting a discharge plasma exhibit convection by use of the Lorentz force drive electromagnetic pump means, provided internally or externally to the laser tube, such as a coil or the like for application of a magnetic field to such laser medium, and thereby capable of producing with no difficulties high-output laser light by improving the laser oscillation efficiency.

What is claimed is:

1. A laser oscillation device comprising:
   a positive electrode and a negative electrode which induce a discharge current therebetween;
   a cooled laser tube containing a laser medium;
   means for applying a magnetic field in a direction that is perpendicular to the discharge current in order to induce circulation of the laser medium in said cooled laser tube,
   wherein the circulated laser medium is cooled by an inner wall of said cooled laser tube.

2. The laser oscillation device as claimed in claim 1, wherein said means for applying a magnetic field is provided to an inside or outside of said cooled laser tube.

3. The laser oscillation device as claimed in claim 1, wherein said means for applying a magnetic field comprises an inductive coil or a magnet provided to an inside or an outside of said cooled laser tube.

4. The laser oscillation device as claimed in claim 1, wherein said means for applying a magnetic field comprises one of an inductive coil and a magnet.

5. A laser oscillation device comprising:
   a positive electrode and a negative electrode which induce a discharge current therebetween;
   a cooled laser tube containing a laser medium;
   a device for applying a magnetic field in a direction that is perpendicular to the discharge current in order to induce a Lorentz force which causes the laser medium to circulate in said cooled laser tube such that the circulating laser medium is cooled by an inner wall of said cooled laser tube.

6. The laser oscillation device as claimed in claim 5, wherein said device for applying a magnetic field is provided to one of an inside or outside of said cooled laser tube.

7. The laser oscillation device as claimed in claim 5, wherein said device for applying a magnetic field comprises an inductive coil or a magnet provided to an inside or an outside of said cooled laser tube.

8. The laser oscillation device as claimed in claim 5, wherein said device for applying a magnetic field comprises one of an inductive coil and a magnet.

\* \* \* \* \*